(No Model.) 2 Sheets—Sheet 1.
J. G. LEE.
WELL DRILLING MACHINERY.
No. 500,142. Patented June 27, 1893.
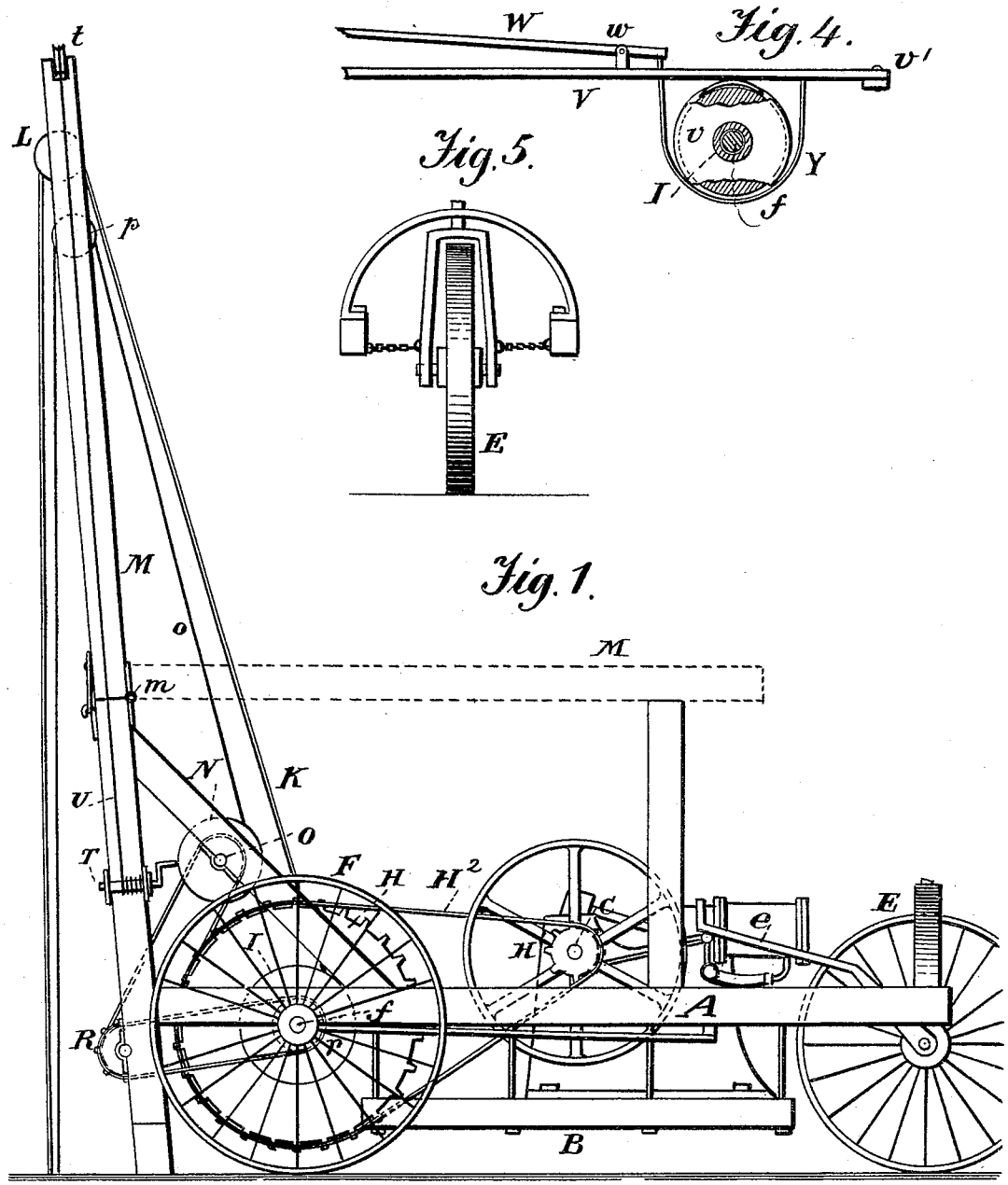
Witnesses.
H. A. Daniels
A. Ruppert
Inventor.
Joseph G. Lee,
Per
Thomas P. Simpson,
Atty.

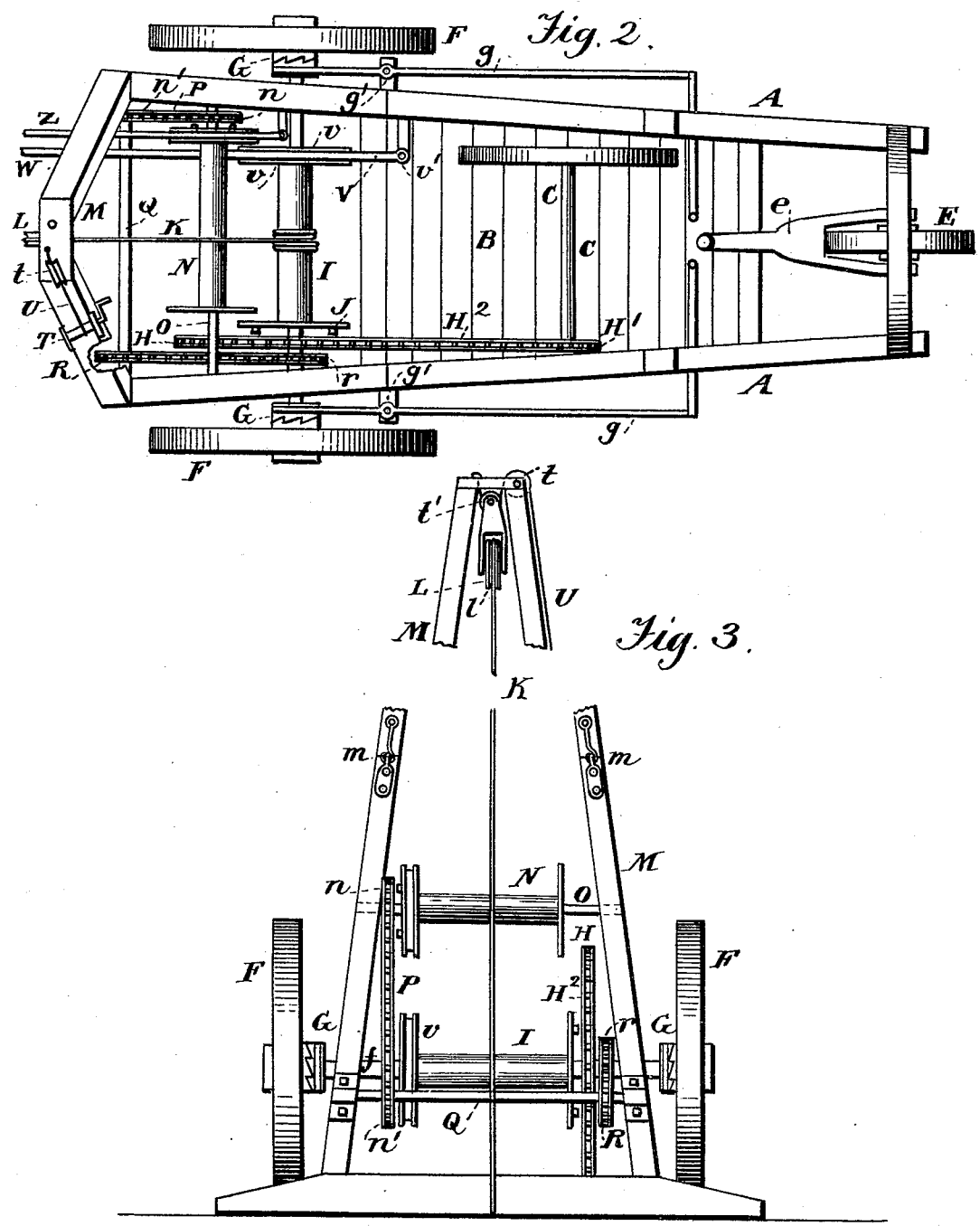

# UNITED STATES PATENT OFFICE.

JOSEPH G. LEE, OF DALLAS, TEXAS, ASSIGNOR OF ONE-HALF TO ROBERT E. LEE, OF SAME PLACE.

WELL-DRILLING MACHINERY.

SPECIFICATION forming part of Letters Patent No. 500,142, dated June 27, 1893.

Application filed January 31, 1893. Serial No. 460,202. (No model.)

*To all whom it may concern:*

Be it known that I, JOSEPH G. LEE, a citizen of the United States, residing at Dallas, in the county of Dallas and State of Texas, have invented certain new and useful Improvements in Well-Drilling Machinery; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to arrange mechanism for drilling and boring on a vehicle so that the engine may be conveniently employed to drill and bore wells as well as serve as a motor for the vehicle.

Figure 1 of the drawings is a side-elevation; Fig. 2 a plan view; Fig. 3 a rear elevation; Fig. 4 a detail of brake and brake levers; Fig. 5 a front elevation.

In the drawings, A represents a tricycle on which is hung by metallic rods an engine bed or support B, between the front and rear wheels.

C is the main shaft of engine while E is the front wheel of vehicle provided with a bifurcated handle $e$ so that the steering may be done by the driver of the vehicle. The rear wheels F F turn loosely on the axle $f$ and are connected by clutches G which are keyed to the axle so as turn with and slide on it.

$g\ g$ are horizontal clutch levers fulcrumed at $g'$ and bent inwardly toward each other to come within easy reach of the driver, so as to throw the wheels F in or out of gear with the sprocket wheel H of the axle, the latter being connected by the said sprocket wheel, a sprocket wheel H' and a chain $H^2$ with the engine shaft C. When the wheels are thus thrown out of gear with sprocket wheel H, the vehicle stops while the axle $f$ continues to rotate.

I is a windlass loose on the axle $f$ and connected by a clutch J with the wheel H. so as to operate the drilling mechanism.

K is a drill rope attached at one end to the windlass I, passing over the pulley L on the mast M and attached at the other end to the drill. By these means, the steam power is made to raise the drill after which the windlass I is thrown out of gear with wheel H to allow the drill to go down into the well again.

N is another windlass on the shaft O arranged to slide thereon and to clutch with the fast pinion $n$, the latter being connected by a sprocket chain P with the sprocket pinion $n'$ on the shaft Q. The shaft Q has also a sprocket wheel R connected by an endless chain with the sprocket wheel $r$ on the axle $f$ so that the engine may turn the windlass N and thus by means of the rope $o$ passing over the pulley $p$ on the mast, operate the sandbucket.

T is a hand windlass carrying one end of a rope U passing over the pulley $t$ and under the pulley $t'$ to the fastening point on the frame. The drillrope pulley has its sheave $l$ provided with a small pulley $t'$ on its upper end, the pulley $t'$ being supported on the rope U which thus becomes a tempering rope to feed the drill downwardly into the well. The mast M is jointed at $m$ so as to be let down partly on the vehicle when traveling from one place to another.

V is a horizontally movable lever fitting a groove of the sliding collar $v$ on the windlass I, its front end being fulcrumed at $v'$ so as to move the windlass back and forth. W is another superposed lever connected with the lever V by a fulcrum post $w$ and a flexible brake strap Y which passes around the sliding collar $v$. By pressing the levers V W together in the hand, the brake is applied, while both levers as well as the brake strap slide together on shaft when operating the clutch. Z is a similar clutch and brake on the sliding collar $z$ of the windlass N.

What I claim as new, and desire to protect by Letters Patent, is—

1. The vehicle axle $f$ having the fast sprocket wheel $z$, loose wheels F F, sliding keyed clutches G G, loose windlass I connected with the drill mechanism, the sprocket wheel H connected with said windlass by the clutch J, the sprocket chain $H^2$, the sprocket wheel H' on shaft C, the shaft O having a loose windlass N connected with the sandbucket mechanism and by a clutch with the fast sprocket pinion n, the sprocket chain P, the shaft Q having a fast sprocket wheel pinion n' and the sprocket wheel R; whereby the engine shaft C may operate the drill, sandbucket and vehicle mechanism substantially as described.

2. The combination with a grooved collar arranged to slide with a sleeve or windlass on a shaft, of the brakestrap Y connected at the ends with two levers V W and passing under said collar; whereby the clutch and brake may be operated as described.

In testimony whereof I affix my signature in presence of two witnesses.

JOSEPH G. LEE.

Witnesses:
R. T. SKILER,
E. R. LOGAN.